(12) United States Patent
Virine et al.

(10) Patent No.: US 6,604,138 B1
(45) Date of Patent: Aug. 5, 2003

(54) SYSTEM AND METHOD FOR PROVIDING DEMOGRAPHICALLY TARGETED INFORMATION

(75) Inventors: Lev D. Virine, Calgary (CA); Todd G. Simpson, Calgary (CA)

(73) Assignee: Clubcom, Inc., Pittsburgh, PA (US)

( * ) Notice: Subject to any disclaimer, the term of this patent is extended or adjusted under 35 U.S.C. 154(b) by 0 days.

(21) Appl. No.: 09/571,071

(22) Filed: May 15, 2000

Related U.S. Application Data (63) Continuation-in-part of application No. 09/161,892, filed on Sep. 28, 1998, now Pat. No. 6,298,218, which is a continuation-in-part of application No. 08/769,774, filed on Dec. 18, 1996, now abandoned.

(51) Int. Cl.[7] .............................................. G06F 13/00
(52) U.S. Cl. ...................... 709/224; 709/219; 706/48; 707/10
(58) Field of Search ................................. 709/202, 203, 709/217, 219, 223, 224, 329; 707/10; 706/46, 48, 52, 55

(56) References Cited

U.S. PATENT DOCUMENTS

| | | | |
|---|---|---|---|
| 3,245,157 A | 4/1966 | Laviana ............................ 35/9 |
| 4,412,631 A | 11/1983 | Haker ........................... 221/66 |
| 5,410,735 A | 4/1995 | Borchardt et al. ............. 455/42 |
| 5,491,839 A | 2/1996 | Schotz .......................... 466/66 |
| 5,510,828 A | 4/1996 | Lutterbach et al. ............ 348/13 |
| 5,682,603 A | 10/1997 | Sano .......................... 455/38.2 |
| 5,717,923 A | * 2/1998 | Dedrick ....................... 707/102 |
| 5,724,488 A | * 3/1998 | Prezioso ....................... 706/52 |
| 5,758,290 A | 5/1998 | Nealon et al. ............... 455/464 |
| 6,199,067 B1 | * 3/2001 | Geller .......................... 707/10 |
| 6,236,978 B1 | * 5/2001 | Tuzhilin ....................... 705/26 |
| 6,308,175 B1 | * 10/2001 | Lang et al. .................... 707/10 |

FOREIGN PATENT DOCUMENTS

| WO | WO 96/01032 | 1/1996 | .......... H04R/27/00 |
|---|---|---|---|
| WO | WO 98/44477 | 10/1998 | .......... G09F/27/00 |

* cited by examiner

*Primary Examiner*—Viet D. Vu
(74) *Attorney, Agent, or Firm*—Reed Smith LLP

(57) ABSTRACT

A system and method for providing demographically targeted information is disclosed. In the preferred embodiment, the system and method of the present invention generates and/or delivers information, such as audio, video and/or the like, to a user, such as a user of an exercise equipment in a gym or club environment, preferably based on the demographics of the user. The information may be provided to the user using one or more of a plurality of channels. A preferred embodiment method for presenting demographically targeted information to the user is disclosed. A preferred embodiment method for automatic generation of a demographic profile of the user in order to provide such demographically targeted information to the user is also disclosed.

28 Claims, 8 Drawing Sheets

SYSTEM AND METHOD FOR PROVIDING DEMOGRAPHICALLY TARGETED INFORMATION

RELATED APPLICATIONS

This application is a continuation-in-part of commonly assigned U.S. patent application Ser. No. 09/161,892, entitled COMBINED ADVERTISING AND ENTERTAINMENT SYSTEM NETWORK, filed Sep. 28, 1998, now U.S. Pat. No. 6,298,218, which is a continuation-in-part of commonly assigned U.S. patent application Ser. No. 08/769,774, entitled MULTI-MODE ENTERTAINMENT SYSTEM USING WIRELESS HEADPHONES, filed Dec. 18, 1996 now abandoned; the disclosures of which applications are hereby incorporated herein by reference. The present application is also related to concurrently filed, and commonly assigned U.S. patent application, entitled SYSTEM AND METHOD FOR INTERACTIVE ON-DEMAND INFORMATION, now U.S. Pat. No. 6,487,390, the disclosure of which application is incorporated herein by reference.

TECHNICAL FIELD

This invention relates to a system and method for providing information to one or more users, and more particularly to an interactive system where information is provided to one or more users on selected ones of a plurality of channels, preferably based on the demographics of the user.

BACKGROUND

A major problem in gyms, stock brokerage houses, factories, and other places where many people gather is to allow each individual person to listen to or view, a unique audio and/or video program without interference with other people in close proximity. Advertisers are often unable to get an attentive audience, especially if the product or service does not appeal to the particular individual. Moreover, individuals receive generic information that is not geared towards their individual lifestyles and/or personal preference. Therefore, in such facilities, there is a need to provide information on an individual basis to the users.

The problem discussed above exists in applications other than traditional radio or television. For example, many portable processors store information in a memory and need to communicate that information to a fixed unit, or to a plurality of fixed units, each possibly operating on different bands, or on different channels, within the same band.

One specific example of such a problem is in a gym environment where there are multiple work stations and many users. Presently, it is common practice to place a video display, such as a television, in a location having common visibility from a number of work stations. This situation does not allow a user to receive targeted data, such as video or audio, communicated only to that user. Consequently, information providers are unable to target their audience based on the needs of the particular individual. Moreover, since the users are not receiving information suitable for their particular purpose, users change the channels, switch off the device or simply ignore the device.

One existing system which attempts to keep the user interested allows the user to interact with the system by using different tools. By using a set-top box connected to the user's television system, the user is able to communicate with the system. Such a system provides the user with an on-screen display on regular television programming, such as satellite TV or cable TV which allows the user to perform certain limited activities.

Moreover, existing systems for providing interactive information to the user are limited by the number of channels available to provide the information to the user. The number of channels is further limited by the fact that most existing systems do not allow the user to receive information in both digital and analog form at the same time. Furthermore, existing systems do not effectively manage the plurality of channels to provide demographically targeted information to a user.

Thus, there is a need in the art for a system and method, that is multi-modal in nature, i.e., it can be used to receive information on several different channels in different formats, with the user being able to control the selection of at least one of the currently operating channels.

There is a further need in the art for a system and method for providing demographically targeted information to a user to facilitate providing demographically targeted information to the user.

There is a still further need in the art for a system and method for dynamically generating the demographic profile of a user.

SUMMARY OF THE INVENTION

These and other objects, features and technical advantages are achieved by a system and method which in the preferred embodiment generates and/or delivers information, such as audio, video and/or the like, to a user, such as a user of an exercise equipment in a gym or club environment, preferably based on the demographics of the user.

The information may be provided to the user using one or more of a plurality of channels. A selected plurality of these channels provides the information to the user in analog form and the remaining channels provide the information in digital form. The information generated and/or delivered to the user may include information such as, training videos, educational programs, movies, digital music, advertisements, information provided over cable TV, information provided over satellite TV and/or other like information.

The preferred embodiment method for presenting demographically targeted information to a user of an exercise equipment via a personal unit attached to the exercise equipment, wherein the personal unit is communicatively connected to a local server of a local network, comprises the steps of allowing the user to log on to the local server; generating content for delivery to the user based in part on the demographic profile of the user, if there is a channel available for delivery of the demographically targeted information, and switching the user to the channel for receiving the contents; arranging a plurality of continuously running channels based in part on the content of the channels to match the demographic profile of the user, if a channel is not available for delivery of the targeted information to the user; selecting a channel from the arranged plurality of channels for presentation to the user based in part on a synchronization delay; and switching the user to the selected channel.

The preferred embodiment method for automatic generation of a demographic profile of the user in order to provide information to the user based on the demographic profile of the user comprises the steps of receiving a user event; determining if the user event exists within a set of configuration data; determining the nature of the user event if the user event exists within the set of configuration data; applying linguistic analysis on the user event and converting the result of the linguistic analysis to a first type of information, if the user event does not have a first type of information associated with the user event; updating statistical data of the user based on the first type of information associated with the user event; and updating a demographic profile of the user based on the user statistical data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

The present invention allows information, such as audio, video and/or the like, to be generated and/or delivered to a user, such as a user of an exercise equipment in a gym or club environment, preferably based on the demographics of the user. The information may be provided to the user using a plurality of channels. A selected plurality of these channels provides the information to the user in analog form and the remaining channels provide the information in digital form. The information generated and/or delivered to the user may include information such as, training videos, educational programs, movies, digital music, advertisements, information provided over cable TV, information provided over satellite TV and/or other like information.

Figure 1:
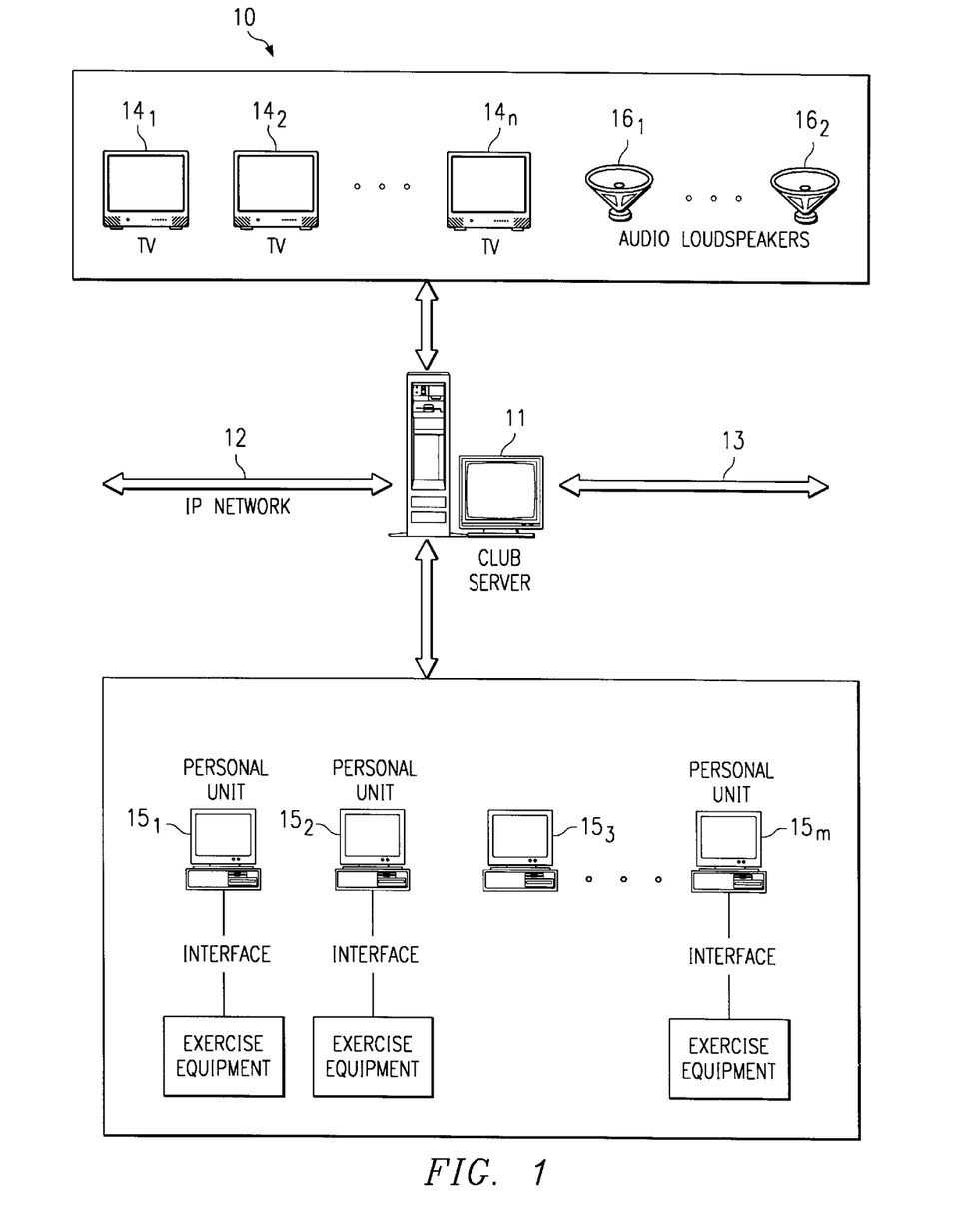
FIG. 1 shows a schematic of a preferred embodiment local information network.

FIG. 1 shows a schematic of a preferred embodiment local information network 10. Local network 10 is preferably located at an establishment, such as a club or gym providing the desired information to its patrons. In the preferred embodiment, local network 10 comprises a server 11. Server 11 is preferably a local server, i.e. a server located at the club or gym. The local server is preferably a PC based computer. In the preferred embodiment, local server 11 is connected to a remote central server, via a communications network 12, such as a communications network capable of TCP/IP communication. The remote central server is preferably under the control of a network operator and is located at a site selected by the network operator. Local server 11 is also preferably connected to other sources and receives information from such other sources, such as cable TV, satellite TV and/or the like, via communications network 13. Communications network 13 may provide information to the club server from such other sources, either in analog or digital format.

Local server 11 is preferably connected to one or more monitors $14_1$ through $14_n$, such as TV monitors, located in the club in which the server is located. Local server 11 is also preferably connected to one or more personal units $15_1$ through $15_m$ via a digital connection, such as an ethernet connection, preferably a 100 MB Ethernet switch. In the preferred embodiment, local server 11 is also connected to one or more personal units $15_1$ through $15_m$ via an analog connection, such as an analog TV connection. In the preferred embodiment each personal unit is connected to or associated with a user work station, such as an exercise equipment, by means of an interface, for example a standard communication interface to cardio-vascular equipment, such as a CSafe interface. In the preferred embodiment, local server 11 is also preferably connected to one or more loudspeakers $16_1$ through $16_L$.

Each personal unit preferably includes a display, such as a touch screen, which allows the user to communicate with the personal unit. In the preferred embodiment, a substantial portion of the display is designated for displaying information received from local server 11, such as training videos. Other areas of the display are designated preferably for an on-screen button pad and/or for displaying banner advertisements. The personal unit of the preferred embodiment is a processor based system, such as a PC based computer. In an alternative embodiment, the personal unit described further in the above referenced U.S. patent application entitled "Combined Advertising and Entertainment System Network",the disclosure of which is incorporated herein by reference, may be used.

Local server 11 receives information, such as network operator provided TV, local club TV, network operator provided radio, digital music library, education and training content, such as video-on-demand, from communications network 12 and/or communications network 13 and provides it to selected ones of monitors $14_1$ through $14_n$, selected ones of personal units $15_1$ through $15_m$, and/or selected ones of loudspeakers $16_1$ through $16_L$. The local server 11 is also preferably used for local network management, network events registration, user event management, such as user logon, user logoff, change of channel by the user, and/or the like.

In the preferred embodiment, third party content providers, such as cable or satellite providers deliver cable and satellite TV signal to the local server 11. The information received from third party cable or satellite providers is preferably in analog form, although if desired, this information may be in digital form. Server 11 delivers the received information to one or more users by displaying it on one or more of the personal units and/or monitors preferably without making any changes to the information received from the third party providers. Although server 11 does not modify the contents as received from third party cable or satellite providers, it tracks any user events, such as change of channel, and sends it to the remote central server for storage and further processing.

Figures 2A, 2B, 2C, 4:
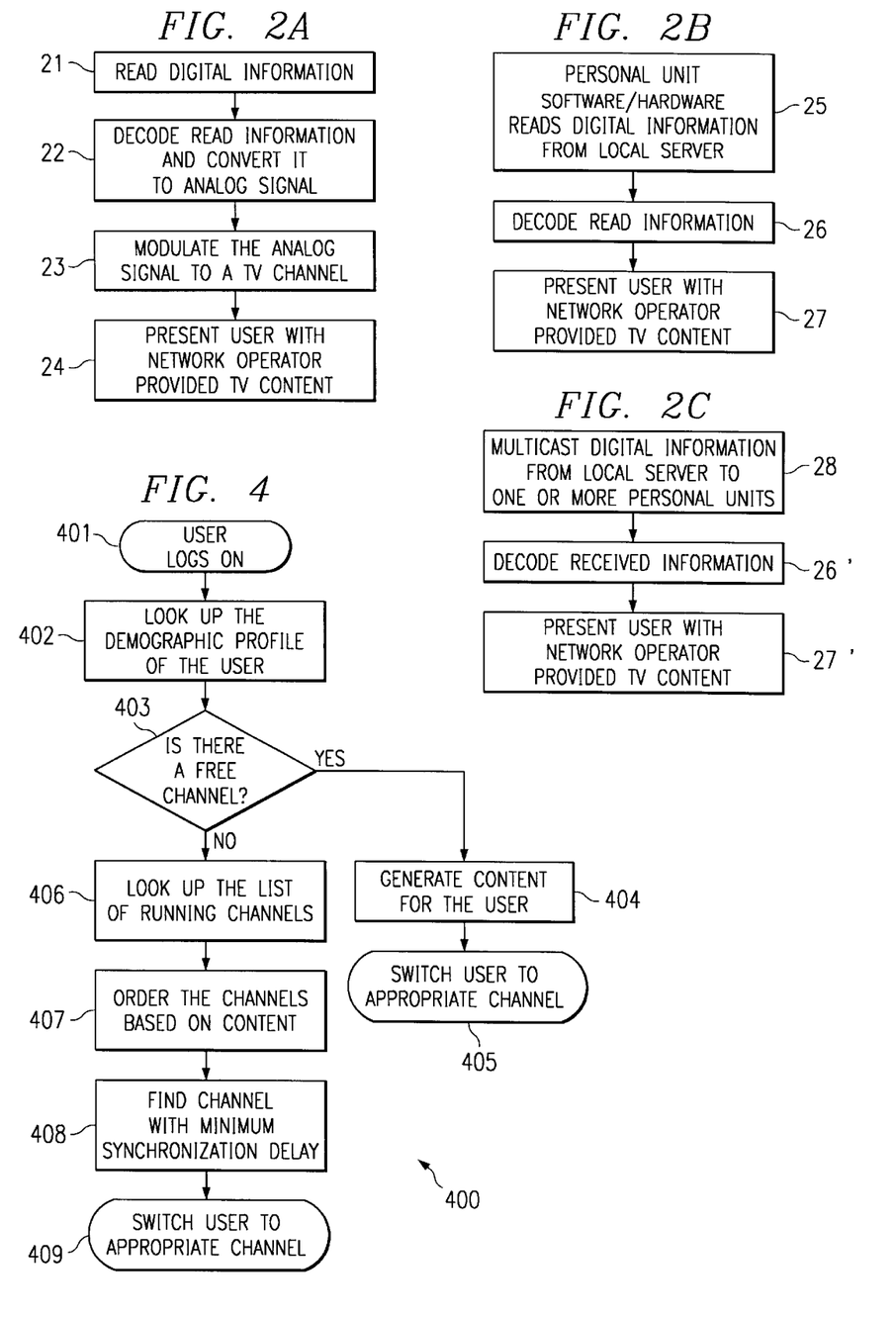
FIG. 2A shows a flowchart for delivering content using analog signals.
FIG. 2B shows a flowchart for digital delivery of content to an individual user.
FIG. 2C shows a flowchart for digital delivery of content using digital streaming from a local server.
FIG. 4 shows a flowchart for switching a user to an appropriate channel.

Network operator provided TV is preferably a group of channels with proprietary content of the network operator and/or its associates. In the preferred embodiment, the network operator provided TV contents are stored on the remote cental server and periodically uploaded from the remote server with the aid of a link, such as a high speed TCP/IP capable communications link, such as DSL, ADSL, cable, ISDN, T1, T3, satellite link and/or the like, from the remote server to the local server. The contents are then stored in a database associated with the local server as a plurality of digital files, for example MPEG files, MP3 files, wave files, and/or the like. As shown in FIGS. 2A, 2B and 2C, network operator provided content may be delivered to one or more of the personal units and/or monitors in one or more ways in analog and/or digital format. In the preferred embodiment network operator provided content is delivered only to one or more personal units.

FIG. 2A shows a flowchart for delivering network operator provided content using analog signals. As shown in FIG. 2A, in step 21, software associated with local server 11 reads the information, such as MPEG files, MP3 files, wave files, and/or the like, stored in the local server. In step 22, the information read from the server is decoded, preferably by means of a digital video decoder, for example one or more MPEG video cards, and converted into analog signals. In step 23, the analog signal is modulated, preferably by using one or more modulators, to a TV channel to be delivered to the user preferably using a local TV cable network. In step 24, the information read from the local server may be presented to the user in addition to or in place of regular satellite or cable channels. In the preferred embodiment, the number of channels delivering network operator TV in analog form is sixteen. Preferably, these channels are continuously playing. In alternative embodiments, the number of channels may vary between four and thirty-two depending upon the configuration of the local network.

FIG. 2B shows a flowchart for digital delivery of network operator TV content to an individual user, i.e. unicasting. As shown in FIG. 2B, in step 25, software associated with the personal unit reads the information, such as MPEG files, MP3 files, wave files, and/or the like, stored in the local server through the local network. In step 26, the information read from the server is decoded by software associated with the personal unit within the personal unit. In the preferred embodiment the software associated with the personal unit resides on the personal unit. In step 27, the decoded information may be presented to the user in addition to or in place of regular satellite or cable channels. In the preferred embodiment, the number of channels providing digital delivery of network operator TV is thirty. In alternative embodiments, the number of channels may vary between fifteen and one hundred depending upon the configuration of the local network.

The advantage of using the method of FIG. 2B for delivery of information to the user is that it does not require any special hardware, such as modulators, digital video decoder, and/or the like. Moreover, in the preferred embodiment the channel is not continuously playing. As the method of FIG. 2B utilizes a dedicated channel between the user and the local server, the user may fast forward or rewind the contents of network operator TV delivered using the method of FIG. 2B. Moreover, the user can stop viewing the channel whenever the user desires. The local server stores the position where the user stopped and if desired, the user can continue viewing the channel where it stopped the last time. Thus, after a user finishes its routine on a particular work station, the user may stop the channel it is viewing. The user may resume viewing the same channel from the position where it stopped on its next visit to the club or on a different work station. As the method of FIG. 2B utilizes dedicated channels for delivery of content to the user, the number of channels providing digital delivery using the method of FIG. 2B is limited by the local network configuration.

FIG. 2C shows a flowchart for digital delivery of network operator TV content using digital streaming from the local server. As shown in FIG. 2C, in step 28, software associated with the local server reads information, such as MPEG files, MP3 files, wave file, and/or the like, stored in the local server and multicasts it to one or more personal units through the local network. In step 26', the information received from the server is decoded by software associated with the personal unit within the personal unit. In the preferred embodiment the software associated with the personal unit resides on the personal unit. In step 27', the decoded information may be presented to the user in addition to or in place of regular satellite or cable channels.

The method described with reference to FIG. 2C requires special local network hardware, such as routers capable of providing multicasting. However, the method of FIG. 2C requires fewer channels to provide the information in digital form to the users as compared to the number of channels required by the method of FIG. 2B as in the preferred embodiment a single channel is shared by more than one user. In the preferred embodiment, the channels to be multicast are continuously playing and thus, a user cannot continue watching the channel where it stopped the last time.

Local club TV includes content, such as an information and advertisement TV channel. Preferably, local TV presentation does not include an audio component and there is only one local TV channel per club. In the preferred embodiment, the content of local club TV is specific for the particular club and includes local news, information and advertisement. Club TV may be delivered in analog or digital format from the local club server 11 or other club server. In the preferred embodiment, club TV is presented to the personal unit when a user is not logged on or it may presented to one or more of monitors $14_1$ through $14_n$.

Network operator provided radio is preferably one channel of network operator audio content. In the preferred embodiment, the network operator provided radio contents are stored on the remote cental server and periodically uploaded from the remote server with the aid of a link, such as DSL, ADSL, cable, ISDN, T1, T3, satellite link and/or the like, from the remote server to the local server. The contents are then stored in a database associated with the local server as a plurality of digital files, for example MP3 files, wave files, and/or the like. Network operator provided radio can be broadcast in the club, for example, by using loudspeakers $16_1$ through $16_L$. Additionally or alternatively, the user may listen to the content of network operator radio by means of headphones as described in the above referenced U.S. patent application entitled "Combined Advertising and Entertainment System Network". Preferably, network operator radio includes audio advertisements. In the preferred embodiment, the local server records when a particular audio segment has been played. The stored information may be periodically provided to the remote central server for example by special software designed for this purpose. This information may be used by the central server for data processing purposes.

The unicasting method described above with reference to FIG. 2B for delivery of network operator TV content may also be used for delivering on-demand content to a user logged onto the local server. The user may select specific programs from a list of available programs. Such programs may include video-on-demand, audio-on-demand, and/or the like. Video-on-demand content may include education, entertainment and/or training content, such as one-on-one training programs, educational programs, movies, digital music, advertisements and/or the like which has been downloaded to the local server from a remote server, such as the above mentioned remote central server or a server of an information provider, for example, Yahoo, Real Networks, and/or the like. The user may select the desired programming from an interactive menu provided on the display or through the headphones. The interactive menu may include content that has been previously ordered by the user. For example, the user may access a website, say from home, and schedule a particular content to be delivered to the user at a particular time at a particular club. Thus, the above mentioned interactive menu presented to the user may include such previously ordered content. If the user is in the club when the user is accessing the website and the content is available then the content may be presented to the user immediately.

The local server preferably records user events, such as events related to the selection of on-demand content by a particular user. This information is preferably sent to the remote central database. The information may be used for example, for user profiling and other data processing function.

The training videos mentioned above may be geared towards a particular user based on the user's demographics and/or workout history. Moreover, if desired, the training videos may include controls for the exercise equipment such that the user's exercise equipment may be physically controlled based on the recommendations made in the training videos. In the alternative, the training videos may make recommendations to the user and the user may manually control the exercise equipment based on the recommendations.

As mentioned above, the local server is connected to a communication network capable of TCP/IP communication. Thus, if desired, a user can access the internet from the personal unit. If desired, the local server can disable certain sites or provide access to certain sites to only approved users. Moreover, the user can make online purchases from the personal unit. Preferably, the local server records user events, such as the websites visited, time spent on a particular website, the user's buying habits, and/or the like. This information is preferably sent to the remote central database. The information may be used for example, for user profiling and other data processing finction.

Figure 3A:
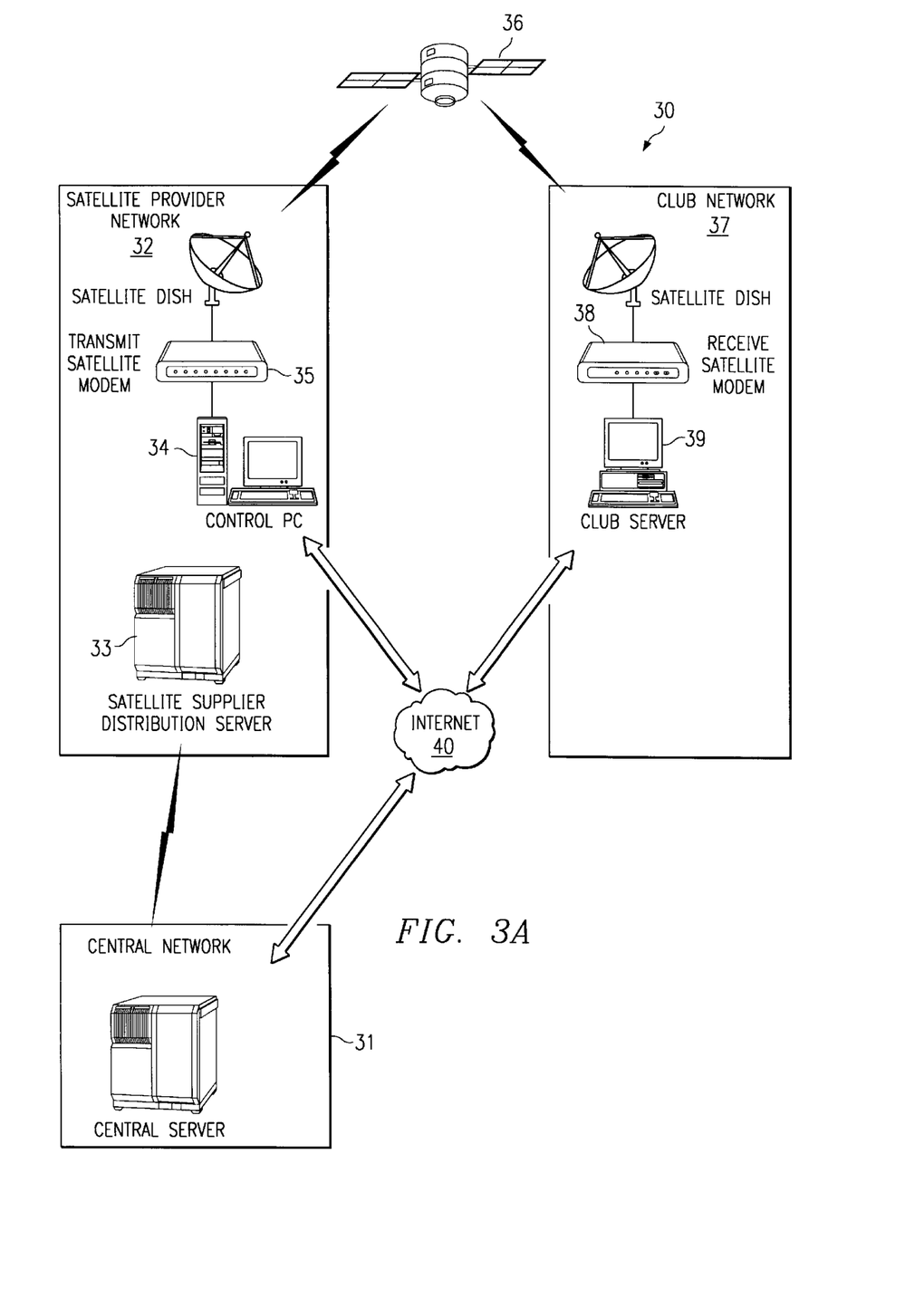
FIGS. 3A and 3B show schematics of a preferred embodiment network including the local server and the remote central server.

FIG. 3A shows a schematic of a preferred embodiment network 30 including the local server and the remote central server for satellite delivery of content. As shown in FIG. 3A, content is provided from network operator 31 to local network 37 via satellite provider network 32 preferably in digital format. Satellite provider network 32 includes a server 33, a processor based control system 34, and a transmit satellite system 35. Local network 37 includes a receive satellite system 38 and a local server 39.

Content from network operator 31 is provided to server 33 of the satellite provider network 32. Server 33 is connected to processor based control system 34, which is preferably a control PC. The control PC manages operation of the satellite provider network. The information received from the network operator is encoded, preferably by the processor based control system 34 and the encoded information is provided to satellite 36 utilizing a transmit satellite modem associated with transmit satellite system 35.

The information from satellite 36 is delivered to local server 39 utilizing a receive satellite modem associated with receive satellite system 38. The received information is decoded and stored in local server 39 for delivery to one or more personal units, loudspeakers, and/or monitors as discussed above with reference to FIG. 1.

Communications network 40, which is preferably capable of TCP/IP communications is preferably used to verify delivery of content to local server 39. Network 40 is preferably also used to send and/or receive commands from network operator 31. For example, upon verification of delivery of content to local network 37, a command may be sent from network operator 31 to local server 39 to activate the content for delivery to one or more personal units, loudspeakers, and/or monitors as discussed above with reference to FIG. 1.

Figure 3B:
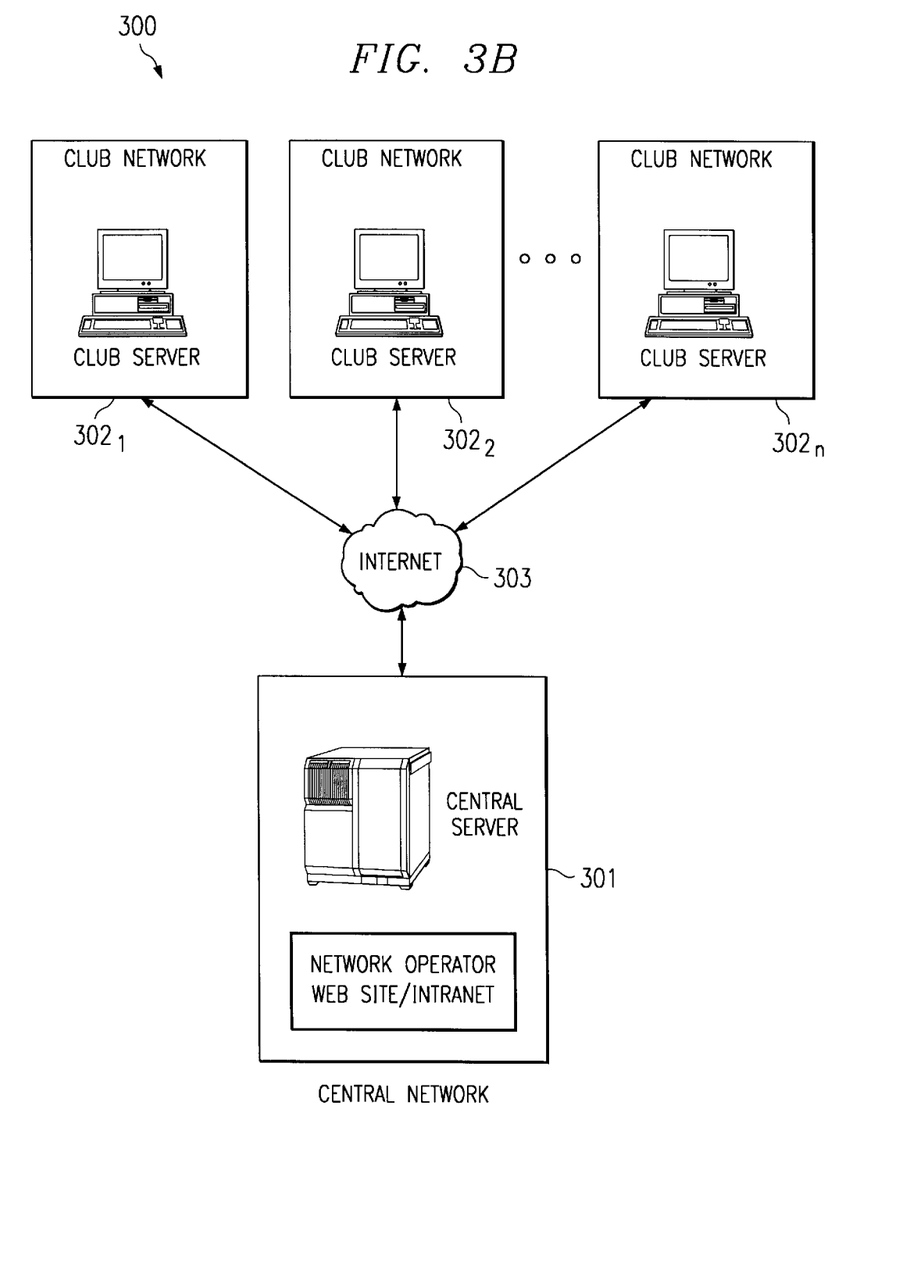

FIG. 3B shows another schematic of a preferred embodiment network 300 including multiple local networks $302_1$ through $302_n$ and the remote central server 301. Information, such as content, commands and events are sent from the local networks to the central server 301 and received by the local networks from the central server 301 using a communications network 303, which is preferably capable of TCP/IP communications. In the preferred embodiment, content is sent from the remote server 301 to the local networks $302_1$ through $302_n$ using high speed internet access, such as Digital Subscriber Line (DSL), ADSL, ISDN, cable and/or the like. Commands are preferably communicated using dial-up access.

The local server periodically sends information about events and other information to the remote central server. These events may be stored on the local server prior to sending them to the remote central server. Events include registration of the user, logon/logoff event, advertisement hit event, state of the local server, state of a particular unit and/or like information. The remote central server sends commands and/or contents to the local server. Commands include updating user information based on data associated with the remote central server, messages, commands to update on-demand programming information and/or other commands.

The network operator server processes events and/or other information received from the local networks and issues commands to the local networks. The network operator server may be used to issue commands to a single local network or multiple local networks simultaneously. The local networks are also capable of generating reports on club activities and providing it to the central network. Reports or other information from the networks may also be available at a website of the network operator. For example, a user could access the website of the network operator to access his workout history. Moreover, a local club operator may access the website of the network operator and access reports regarding the activities related to the club. Additionally or in the alternative, the central network may process the events and/or other information received from one or more local networks and provide such processed information as reports on the website associated with the network operator.

FIG. 4 shows a flowchart 400 for switching a user to an appropriate channel. In step 401 the user logs on to the local server. Preferably, the user logs on to the local server by entering his username and password on the display screen. In an alternative embodiment, if the user is in possession of a headset as described in the above referenced U.S. patent application entitled MULTI-MODE ENTERTAINMENT SYSTEM USING WIRELESS HEADPHONES, the system may detect the user by means of a signal sent from the headphone and log the user onto the system. Once the user logs onto the system, the demographic profile of the user is looked up in step 402. The demographic profile of the user contains information about the user. In the preferred embodiment, the demographic profile of the user is stored and looked up in a database in the local server. Preferably this information has been provided to the local server from the remote central server. In an alternative embodiment, the demographic profile of the user is looked up in the remote central server itself.

In step 403, software running on the local server determines whether there is an available channel. In the preferred embodiment, this step is performed based on the method discussed below with reference to FIG. 6. If there is an available channel, whether analog or digital, then in step 404 the channel is allocated for the particular user and content is generated for the particular user based on the demographic profile of the user. In the preferred embodiment, the content, such as advertisements, is generated based on the method discussed below with reference to FIGS. 7A–7C. The contents may be scheduled for delivery to the user at a later time, if desired. In step 405, the user is switched to the allocated channel for viewing the contents. In the preferred embodiment, only the particular user for whom the channel is allocated is able to receive the contents of the particular channel and a different user cannot receive the contents of the allocated channel.

If there is no available channel for delivery of targeted information to the particular user, then in step 406, the list of continuously running channels is looked up. In a continuously running channel, preferably information is present in a loop and repeats itself. The contents of the continuously running channel may be in analog or digital form. However, it is preferred that the contents of the continuously running channel be in analog form.

Each continuously running channel plays information preferably targeted to a particular user group. For example, advertisement for men, advertisement for women, and/or other targeted information. The list of continuously running channels is looked up to find a channel that best fits the demographic profile of the user. Thus, by comparing the demographic profile of the user with the user group towards which a particular channel is targeted an appropriate channel may be selected for the user. For example, if the demographic profile of the user indicates that the user is a male who leads an active lifestyle then the channel directed towards active males may be selected. However, if demographic data about the user is not defined or there is no match between the user demographic data and the continuously running channels then a channel with general information may be selected.

In step 407, the continuously running channels are ordered based on how well the scheduled content of the channels matches the demographic profile of the user. Thus, a user may be switched between the different channels based on the demographic profile of the user and the contents of the different channels. In step 408, a channel preferably within the same demographic group with minimum synchronization delay is selected. For example, in each channel a particular piece of information, say an advertisement, runs for a particular time, say 30–45 seconds. It is not desirable to show only a portion of a piece of information to a particular user. Thus, in order to present the entire piece of information to the user, a delay is preferably introduced prior to switching the user to a particular channel. Different programs on different channels may be at different stages of presentation. Thus, for example, a first channel directed towards a group that matches the demographic profile of the user may have an advertisement that ends in fifteen (15) seconds and a second channel directed towards the same demographic profile may have an advertisement that ends in thirty (30) seconds. In this example, the channel with the lower synchronization delay, i.e. the first channel will be selected. After waiting for the channel to synchronize, in step 409 the user is switched to the appropriate channel for viewing the contents. Upon completion of presentation to the user from a particular channel, the user is switched to the next channel scheduled for the user.

Figure 5:
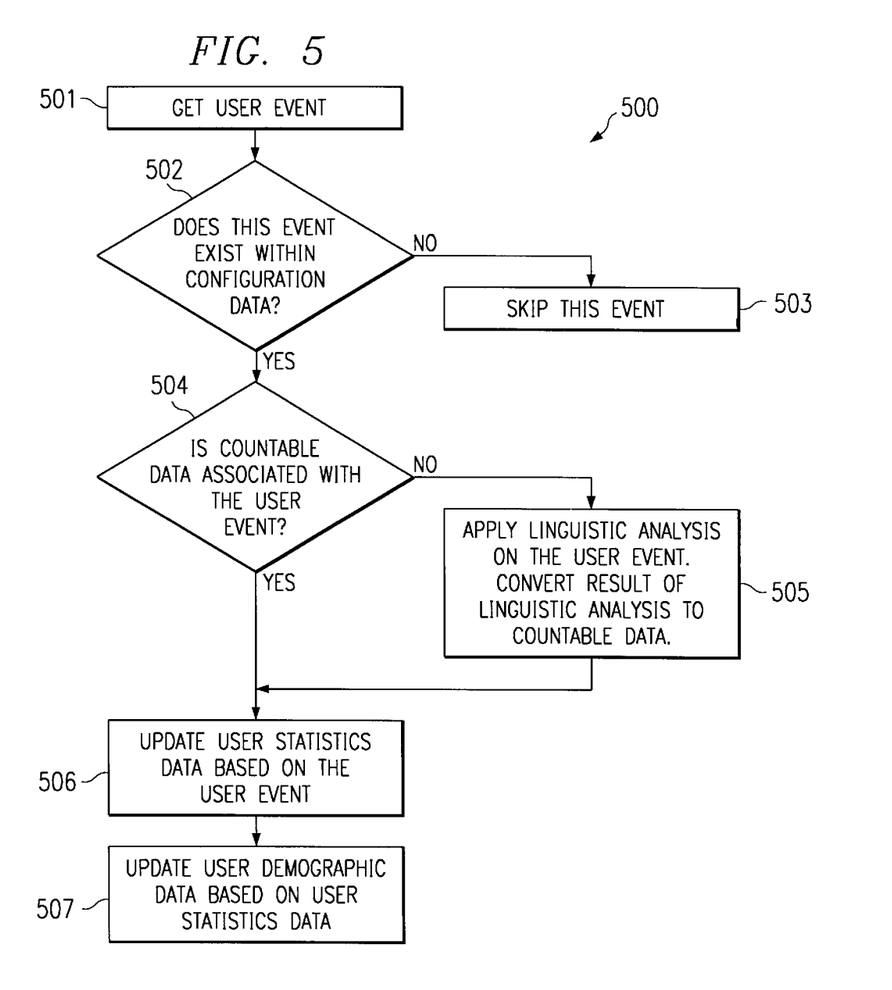
FIG. 5 shows a flowchart for the automatic generation of a demographic profile of a user.

FIG. 5 shows a flowchart 500 for the automatic generation of the demographic profile of a user. In step 501, the system receives a user event. A user event is any input from the user. Upon receiving an event from a user, in step 502, a determination is made as to whether the received event exists within a set of configuration data. The set of configuration data includes a list of events along with information, such as a procedure, associated with each listed event. For example, configuration data may include data related with user events, such as logon, logoff, request for video-on-demand, request for audio-on-demand, request for a particular website, change of channel, change in the setting of the exercise equipment, menu selection and/or the like.

In the preferred embodiment, an object oriented approach is used to process the user events and the set of configuration data is implemented as a plurality of objects. Each object is associated with a particular user event. In the preferred embodiment, each object includes configuration settings and a procedure. Configuration data is desirable to convert a user event to statistics of the user preferences (user statistics data). The procedure associated with each listed event preferably defines how user event is to be converted to user statistics data.

If the received user event does not exist within the set of configuration data, then the received user event is skipped (step 503). Such a user event may be an event that does not facilitate generation of user demographic data and is therefore irrelevant. The set of configuration data may be changed periodically in order to get a more accurate understanding of the user preferences. Thus, for example, if a currently listed event is found not to contribute to demographic profiling of the user, that event may be removed from the list. On the other hand, if a particular event not currently listed is found to be helpful in demographically profiling a user, then the event may be added to the list. Additionally, the procedure for converting a user event to user statistics data may be modified, if desired, to generate a more accurate demographic profile of a user.

A user event is preferably one of two types: an event with associated countable data and an event with associated text information. An event with associated countable data may be, for example, logon, logoff, minutes of workout on a particular exercise equipment and/or the like. An event with associated text information may be, for example, name of a website, TV channel preference, and/or the like. Some events may have associated with them both countable data and text information. Thus, in step 504, a determination is made as to whether countable data is associated with the user event. If countable data is not associated with the user event, then in step 505, a linguistic analysis is preferably applied to the user event to generate countable data. For example, TV channel name (or website name) may be converted to TV channel type (or website type), such as sports, news, financial, local, and/or the like. The duration or the amount of time the user spent on a particular channel (or on a particular website) may also be calculated, if desired. Assume, that the user event is watching the TV channel "Golf Network" for three hours. The user event triggers the associated object. Because this event is not a countable event (such as logon), linguistic analysis is performed on the event. In the preferred embodiment, during this step the procedure associated with the user event analyzes the TV channel name using keywords.

Irrespective of whether a user event has countable data associated with it, in step 506, the user statistics data associated with the particular user is updated based on the user event. Thus, in the above example, the user statistics data is updated to reflect that the user watched golf for three hours.

The statistics of user preferences, i.e. the user statistics data, is preferably a list of user actions along with associated data for a certain period of time. In the preferred embodiment, the list of user actions or items is predefined. However, the associated data is based on the user actions. For example, the list of user actions may include number of log ons, number of workouts and other actions. A demonstrative example of user statistics data for a particular month is presented below:

| ITEMS | USER PREFERENCE |
| --- | --- |
| Number of log ons | 24 |
| Number of workouts | 40 |
| Total time watching TV | 40 hours |
| Total time listening to CD | 20 hours |
| Total time listening to network operator provided radio | 5 hours |
| Total time surfing the internet | 2 hours |
| Total time watching movies | 2 hours |
| Total time watching golf | 3 hours |

Although in the preferred embodiment the list of user actions is predefined, in alternative embodiments, the list of user actions may be dynamically generated.

In step 507, the user demographic data, i.e., the demographic profile of the user, is generated, if the profile does not already exist. If the user demographic profile exists than the data is updated based on the user statistics data. In the preferred embodiment, the user demographics data includes a list of user demographics parameters along with associated data, such as a coefficient. In the preferred embodiment, the list of user demographics parameters is predefined. However, the associated data is not predefined and is preferably based on the user statistics data. In the preferred embodiment, the coefficient associated with a demographic parameter varies from −100 to +100. In the preferred embodiment, a zero coefficient value indicates that the particular demographic parameter does not apply to a particular user. Also in the preferred embodiment, positive and negative coefficients are used for alternative selections, such as male/female, married/single, likes/dislikes, and/or the like. The actual coefficient values of the demographics parameter determines the importance of the particular parameter in the selection of targeted information for the particular user. A demonstrative example of a user demographic profile for a single male with income of $40 K who likes golf is presented below:

| No. | DEMOGRAPHIC PARAMETER | COEFFICIENT VALUE |
| --- | --- | --- |
| 1. | Make (1)/Female (−1) | 1 |
| 2. | Married (1)/Single (−1) | −1 |
| 3. | Income below $25K | 0 |
| 4. | Income between $25K and $50K | 1 |
| 5. | Income between $50K and $100K | 0 |
| 6. | Income greater than $100K | 0 |
| 7. | Likes sports | 0 |
| 8. | Likes golf | 1 |
| 9. | Likes gambling | 0 |

Although in the preferred embodiment the list of user demographics parameters is predefined, in alternative embodiments, the list of user demographics parameters may be dynamically generated. For example, additional parameters may be added to the list as desired. Moreover, in the preferred embodiment, certain information about the user is entered in the demographics profile during registration, such as male/female, age, and/or the like, while others are updated based on user statistics data. Thus, for example, according to the user statistics if the user watched golf more than 10% of the time, the "Like golf" field within the user demographic profile will be updated, say from 1 to 2. The demographic profile of the user may be updated periodically, say once a day, once a week, or once a month, depending on the usage of the club.

Figure 6:
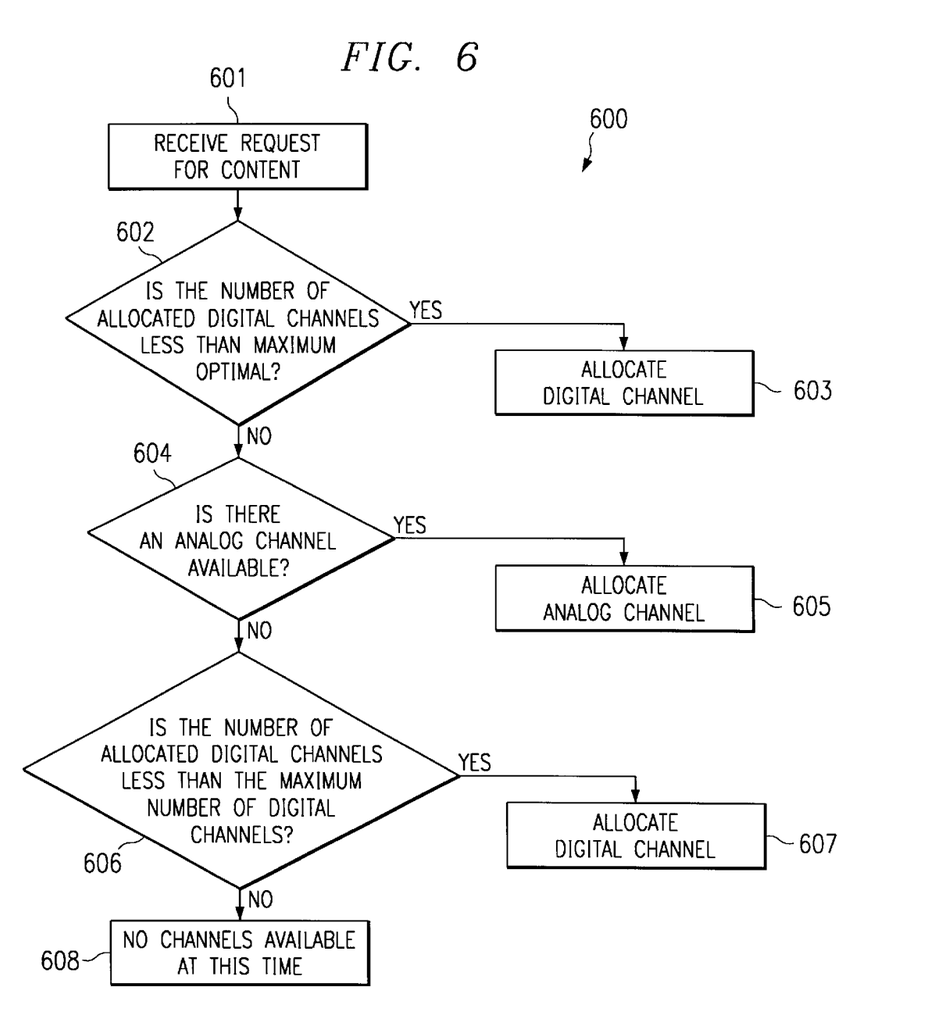
FIG. 6 shows a flowchart for balancing the load between analog and digital channels in the local network.

FIG. 6 shows a flowchart 600 for balancing the load between analog and digital channels in the local network. The need for load balancing between analog and digital channels arises because both digital and analog channels have limitations associated with them. For example, there are only a limited number of digital channels in the network. Analog channels require special hardware in the local server to convert the data, such as MPEG files, MP3 files, wave files and/or the like, from digital to analog format. Thus, the analog channels are limited by the number of digital video decoders and other hardware in the server. In the preferred embodiment, the continuously playing channels are analog channels and the on-demand information is provided over digital channels. However, if the number of on-demand channels required exceeds the number of digital channels, then the load balancing algorithm allows information to be delivered over any available analog channels. By providing content over both analog and digital channels, the bandwidth of the system is increased thereby increasing the capacity of the network.

As shown in FIG. 6, in step 601, a request for content, such as video-on-demand, audio-on demand, demographically targeted advertisement and/or the like, is received from a user. In step 602 a determination is made as to whether the number of allocated digital channels is less than the maximum optimal number of digital channels. If the number of allocated digital channels is less than the maximum optimal number of digital channels, then in step 603 a digital channel is preferably allocated for the user. Otherwise, in step 604, a determination is made as to whether an analog channel is available. If an analog channel is available, then in step 605 an analog channel is allocated for providing the user desired content to the user in analog format. In the preferred embodiment, the analog channel allocated is not a continuously playing channel. Otherwise, in step 606, a determination is made as to whether the number of allocated digital channels is less than the maximum number of digital channels. If the number of allocated digital channels is less than the maximum number of digital channels, then in step 607 a digital channel is allocated for providing the user desired content to the user in digital format.

The optimal number of digital channels is based on the performance of the system. For example, the quality of presentation may be good if there are 50 or less digital channels allocated. In such a case the optimal number of digital channels is 50. However, for the same system if the number of allocated digital channels is more than 60, the system performance might be affected significantly. In such a case the maximum number of digital channels is 60. For the number of allocated digital channels between 50 and 60, although the quality of presentation is inferior than the quality of presentation when the number of allocated digital channels is 50 or less, the presentation is still of an acceptable quality. Therefore, based on the above example, in step 606 of the flowchart of FIG. 6, if 52 digital channels are already allocated and there are no available analog channels, then the system will allocate a digital channel to the user. However, if 60 digital channels are already allocated, then the system will not allocate a digital channel.

Otherwise, in step 608, it is concluded that no channel is available to be allocated to provide on-demand information to the user at the present time. In such a situation, if the user has requested advertisements, then the user is presented with default advertisements. These default advertisements are not necessarily tailored to the particular user's demographics. The default advertisements are preferably broadcast continuously from the local server or they may be stored in the cache of one or more of the personal units. If the user requested anything other than advertisements, then the user's demand is scheduled for delivery another time. Additionally, or in the alternative, the user may be given the choice to join other channels in progress. The choice of channels presented to the user for join-in may be based on the demographics of the user as discussed above with regard to FIG. 4. For example, a user of step machines is more likely to share content with other users of step machines than with users of other types of exercise equipment. Thus, in the preferred embodiment, if a user cannot be individually targeted, it is targeted in the smallest possible group. In any case, if the user's request cannot be fulfilled due to lack of an available channel, then the demand is canceled.

Businesses interested in advertising can access the website of the network operator and submit content through a web interface to an advertising server associated with or part of the remote central server. Such businesses interested in advertising may include advertisement agencies, local businesses, national businesses, regional businesses, the clubs and/or the like. At the time of submitting content to the advertising server, the advertisers may provide information as to the particular locations where they would like to present the advertisement. Thus, for example, local businesses may desire to advertise only in local clubs and thus they can specify the locations where they would like their advertisements to be displayed. Morever, the advertisers may themselves provide information as to what time of the day they would like the advertisements to be presented and the sequence of the presentation.

In the preferred embodiment, each advertisement has associated with it a particular demographic profile towards which the advertisement is targeted. In the preferred embodiment, the advertisement demographic profile has substantially the same format as the user demographic profile and includes a list of advertisement demographic parameters along with associated data such as a coefficient. In the preferred embodiment, the sequence of advertisement demographics parameters in the advertisement demographic profile tracks the sequence of user demographics parameters in the user demographic profile. Furthermore, each advertisement also has an associated category, such as shoes, sun glasses, shirts, and/or the like.

Based on the input, the advertisements would be scheduled to be delivered to the servers associated with the local clubs. The content is delivered to the local network from the remote central server, preferably via communications network 12 (FIG. 1), which is capable of TCP/IP communication. Additionally or in the alternative, content can also be delivered using satellite communication. In the preferred embodiment, the remote central server schedules delivery of the content to the local servers based on the utilization of the local servers, such that the effect on the local network is minimized. Thus, the time of delivery of the advertisements to the local remote central server may vary from one club to another. Each local server also includes a list of general advertisements and a list of advertisements that can be tailored to the demographic profile of a user.

The advertisements may be presented on the personal units in a synchronized manner as discussed in the above referenced U.S. patent application entitled "Combined Advertising and Entertainment System Network". Additionally or in the alternative, the advertisements can be demographically targeted to a particular user as discussed below with reference to the flowchart of FIGS. 7A–7C.

Figure 7A:
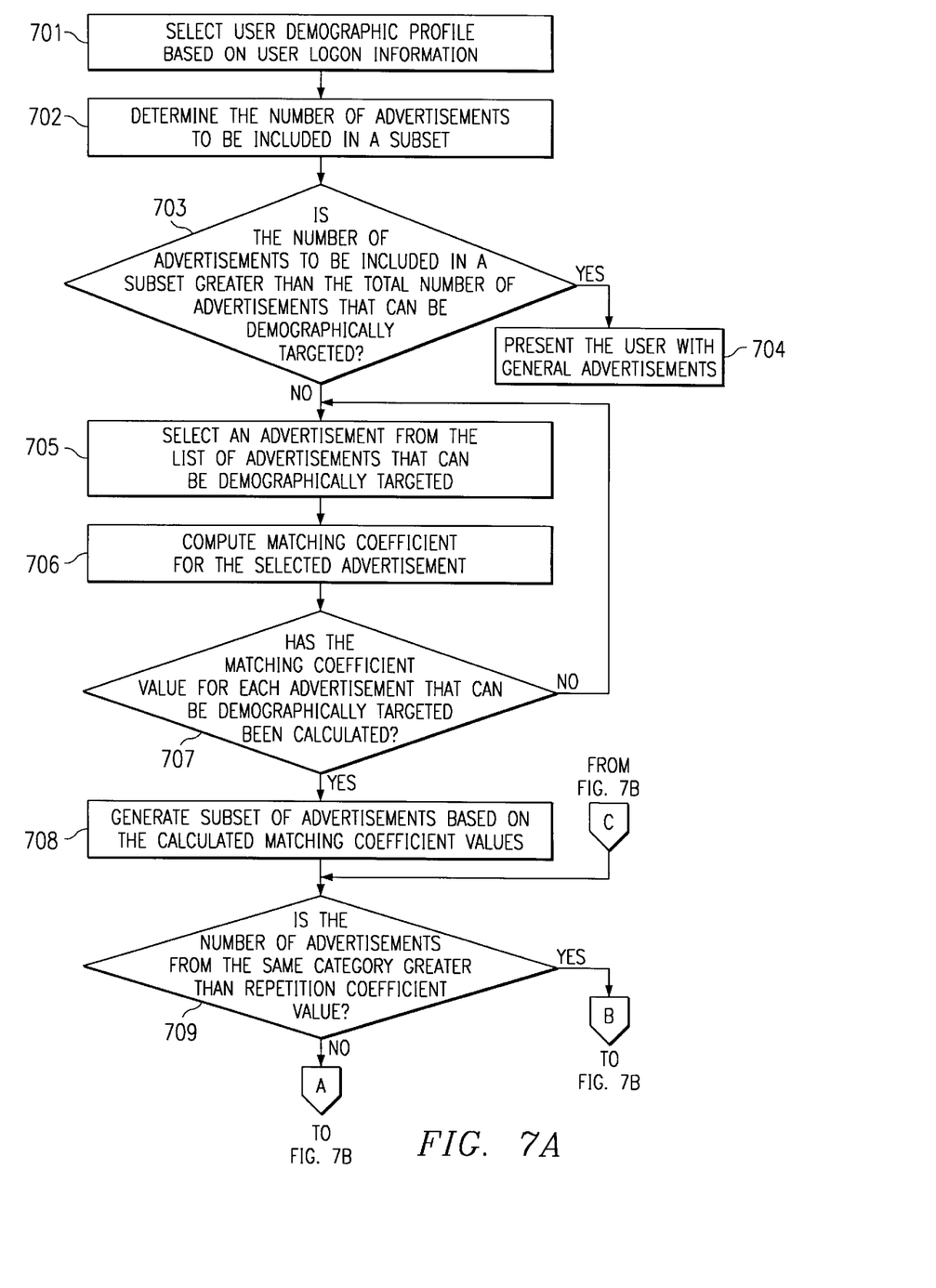
FIGS. 7A, 7B & 7C show flowcharts for the selection of demographically targeted information.
Figures 7B, 7C:
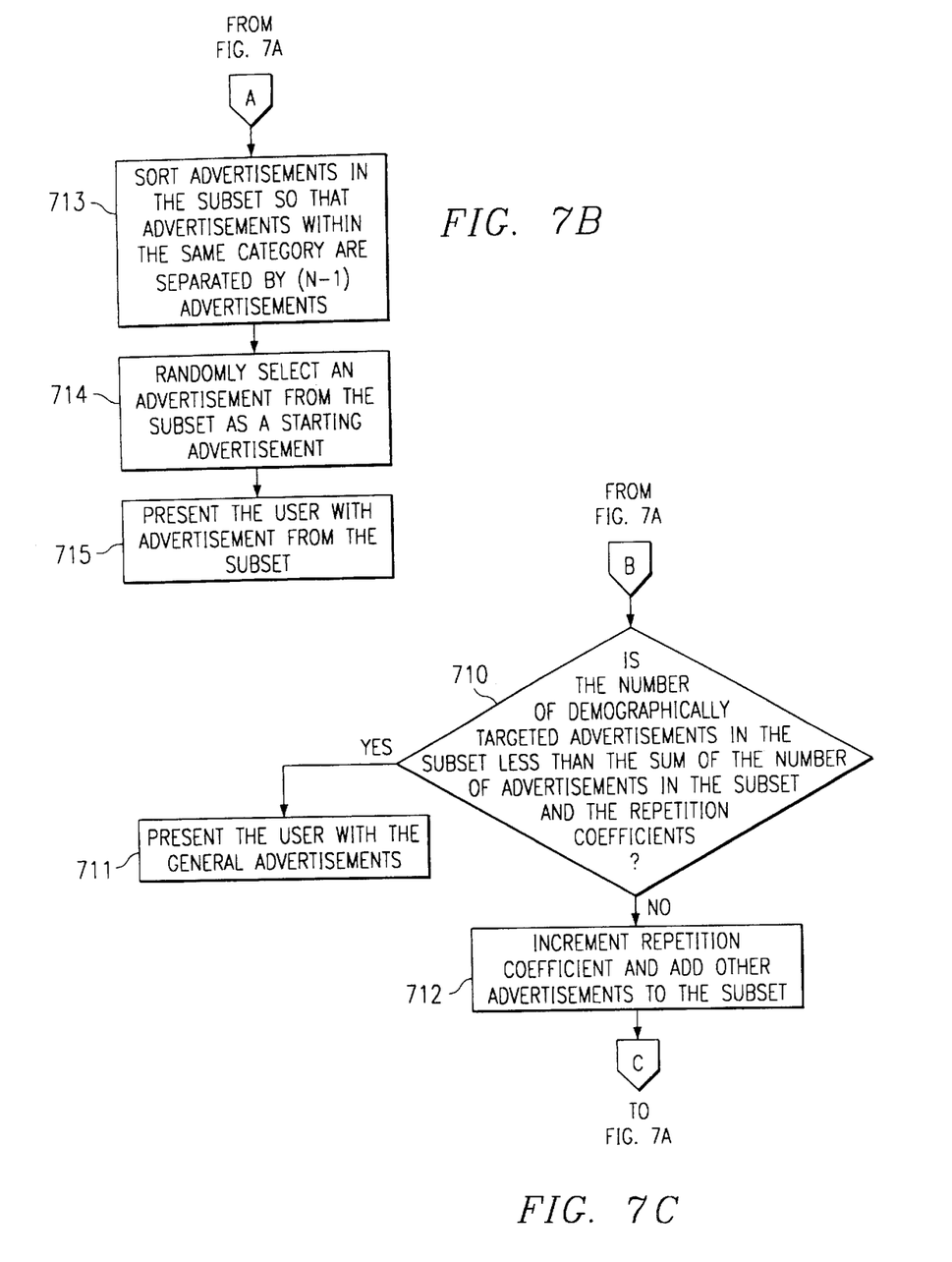

FIGS. 7A–7C show flowchart 700 for the selection of demographically targeted information, such as advertisements. In step 701, the demographic profile of a user is selected based on the user logon information. If the user does not have a demographic profile then general advertisements will be presented to the user. However, in either case, it is not desirable to present the user with the same advertisements especially the same advertisements in the same sequence every time the user logs on. Accordingly, a subset of advertisements is selected for presentation to the user so that the advertisements presented to the user may be rotated. Accordingly, in step 702, the number of advertisements to be included in the subset ($T_{subset}$) is determined. In the preferred embodiment, the number of advertisements in the subset is equal to the number of advertisements a user is supposed to watch multiplied by the repetition coefficient. The repetition coefficient determines how often the user will see the same advertisements. Thus, for example, a repetition coefficient of four (4) indicates that the user will see the same advertisements every fourth logon. However, the user may see certain advertisements more frequently because of random selection of the advertisements from the subset as discussed below with regard to step 714.

If the number of advertisements to be included in the subset is greater than the number of advertisements that can be demographically targeted (step 703), then the user is presented with general advertisements (step 704). If the number of advertisements to be included in the subset is not greater than the number of advertisements that can be demographically targeted (step 703), then in step 705 an advertisement is selected from the list of advertisements that can be demographically targeted. In step 706 a matching coefficient for the selected advertisement for the particular user is calculated. In the preferred embodiment, the user demographic parameter value for a particular demographic parameter is multiplied by the advertisement demographic parameter value of the corresponding demographic parameter to give a resultant demographic parameter value for the particular demographic parameter. The sum of all the resultant demographic parameter values for all the demographic parameters gives the matching coefficient value for the selected advertisement. In the preferred embodiment, the advertisement demographic parameter value is a weight coefficient and indicates the relative importance of a demographic parameter. A demonstrative example for calculating the matching coefficient for a particular advertisement for a single male with income of $40 K who likes golf is presented below:

| DEMO-GRAPHIC PARAMETER | USER DEMO-GRAPHIC PARAMETER VALUE | ADVERTISE-MENT DEMOGRAPHIC PARAMETER VALUE | RESULTANT DEMO-GRAPHIC PARAMETER VALUE |
|---|---|---|---|
| 1. Male/Female | 1 | 10 | 10 |
| 2. Married/Single | −1 | 5 | −5 |
| 3. Income < $25K | 0 | 1 | 0 |
| 4. Income between $25K and $50K | 1 | 1 | 1 |
| 5. Income between $50K and $100K | 0 | 1 | 0 |
| 6. Income greater than $100K | 0 | 0 | 0 |
| 7. Likes sports | 0 | 4 | 0 |
| 8. Likes golf | 1 | 2 | 2 |
| 9. Likes gambling | 0 | 0 | 0 |
| Matching coefficient value | | | 8 |

In step 707 a determination is made as to whether the matching coefficient value for each advertisement that can be demographically targeted has been calculated. If the matching coefficient value for all advertisements that can be demographically targeted has not been calculated then steps 705 and 706 are repeated. After the matching coefficient value for all demographically targetable advertisements has been calculated, then in step 708, the demographically targetable advertisements to be included in the subset of advertisements is selected based on the calculated matching coefficient value. In the preferred embodiment, the advertisements with the best matching coefficient value are selected first. In the preferred embodiment, the advertisements with the best matching coefficient value are the advertisements with the highest matching coefficient value. Thus, for example, if the number of advertisements to be included in the subset of advertisements is 16, then in the preferred embodiment the 16 advertisements with the highest matching coefficient value are included in the subset.

It is desirable that the user be not presented with advertisements in the same category during a particular session. Thus, in order to not present the user with advertisements for the same or similar product during a particular session, it is desirable that the number of advertisements within the same category in the subset be less than the repetition coefficient. Accordingly, in step 709 a determination is made as to whether the number of advertisements in the subset from the same category is greater than the repetition coefficient value. If the number of advertisements in the subset from the same category is greater than the repetition coefficient, then in step 710 a determination is made as to whether the number of demographically targetable advertisements is less than the sum of the number of advertisements in the subset and the repetition coefficient value. If the number of demographically targetable advertisements is less than the sum of the number of advertisements in the subset and the repetition coefficient value, then the user is presented with general advertisements (step 711). Otherwise the value of the repetition coefficient is incremented by one and one or more other advertisements are added to the subset of advertisements (step 712). In the preferred embodiment, the number of additional advertisements added is equal to the value of the repetition coefficient before the increment.

After the subset is ready, i.e., the number of advertisements in the subset from the same category is less than or equal to the repetition coefficient, then preferably the advertisements in the subset are sorted so that the user will not see advertisements from the same category within a particular session. In order to avoid presenting the user with advertisements in the same category within the same session, any advertisements in the subset which are within the same category are preferably separated by (N−1) other advertisements, where N is the repetition coefficient. Thus, in step 713, the advertisements in the subset are sorted so that advertisements within the same category are separated by (N−1) advertisements. In step 714 an advertisement within the subset is randomly selected and in step 715 the advertisements are presented to the user with the randomly selected advertisement as the first advertisement. For example, if the number of advertisements in the subset is 18 and the number of advertisements to be presented in a particular session is 4 and the randomly selected advertisement is advertisement number 17 within the subset, then advertisement numbers 17, 18, 1, and 2 are presented to the user in that particular order.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for automatic generation of a demographic profile of a user in order to provide information to said user based on said demographic profile of said user, comprising the steps of:

receiving a user event;

determining if said user event exists within a set of configuration data;

determining the nature of said user event if said user event exists within said set of configuration data;

applying linguistic analysis on said user event and converting the result of said linguistic analysis to a first type of information, if said user event does not have a first type of information associated with said user event;

updating statistical data of said user based on said first type of information associated with said user event; and updating a demographic profile of said user based on said user statistical data.

2. The method of claim 1, wherein said first type of information is countable data.

3. The method of claim 1, wherein said user event has countable data associated with it.

4. The method of claim 1, wherein said user event has text information associated with it.

5. The method of claim 4, wherein said text information is selected from the group consisting of name of a website and type of TV channel.

6. The method of claim 1, wherein said user event comprises an event selected from the group consisting of logon, logoff, request for video-on-demand, request for audio-on-demand, request for a particular website, and change of channel.

7. The method of claim 1, wherein said user event is a change in the setting of an exercise equipment.

8. The method of claim 1, wherein said step of applying linguistic analysis comprises the step of:

analyzing said user event by utilizing keywords.

9. The method of claim 8, further comprising;

converting said result of said linguistic analysis to countable data.

10. The method of claim 1, wherein said user statistical data comprises:

a list of user actions with associated user preferences.

11. The method of claim 1, wherein said demographic profile of said user, comprises:

a list of demographic parameters with associated coefficients.

12. The method of claim 1, wherein said set of configuration data includes a list of user events, wherein each user event in said list has associated information.

13. The method of claim 12, wherein said list of user events is updated periodically to generate a more accurate demographic profile of said user.

14. The method of claim 1, wherein said user event is received from a personal unit attached to an exercise equipment from a user of said exercise equipment.

15. Computer executable software code stored on a computer readable medium for automatic generation of a demographic profile of a user in order to provide information to said user based on said demographic profile of said user, comprising:

code for receiving a user event;

code for determining if said user event exists within a set of configuration data;

code for determining the nature of said user event if said user event exists within said set of configuration data;

code for applying linguistic analysis on said user event and converting the result of said linguistic analysis to a first type of information, if said user event does not have a first type of information associated with said user event;

code for updating statistical data of said user based on said first type of information associated with said user event; and code for updating a demographic profile of said user based on said user statistical data.

16. The computer executable software code of claim 15, wherein said first type of information is countable data.

17. The computer executable software code of claim 15, wherein said user event has countable data associated with it.

18. The computer executable software code of claim 15, wherein said user event has text information associated with it.

19. The computer executable software code of claim 18, wherein said text information is selected from the group consisting of name of a website and type of TV channel.

20. The computer executable software code of claim 15, wherein said user event comprises an event selected from the group consisting of logon, logoff, request for video-on-demand, request for audio-on-demand, request for a particular website, and change of channel.

21. The computer executable software code of claim 15, wherein said user event is a change in the setting of an exercise equipment.

22. The computer executable software code of claim 15, wherein said code for applying linguistic analysis comprises:

code for analyzing said user event by utilizing keywords.

23. The computer executable software code of claim 22, further comprising;

code for converting said result of said linguistic analysis to countable data.

24. The computer executable software code of claim 22, wherein said user statistical data comprises:

a list of user actions with associated user preferences.

25. The computer executable software code of claim 15, wherein said demographic profile of said user, comprises:

a list of demographic parameters with associated coefficients.

26. The computer executable software code of claim 15, wherein said set of configuration data includes a list of user events, wherein each user event in said list has associated information.

27. The computer executable software code of claim 26, wherein said list of user events is updated periodically to generate a more accurate demographic profile of said user.

28. The computer executable software code of claim 15, wherein said user event is received from a personal unit attached to an exercise equipment from a user of said exercise equipment.

* * * * *